United States Patent
Johnson et al.

[11] Patent Number: 6,027,704
[45] Date of Patent: Feb. 22, 2000

[54] PROCESS FOR THE REDUCTION OF $SO_2$ FROM WET LIME/LIMESTONE TAILGAS IN POWER PLANT DESULFURIZATION PROCESSES

[75] Inventors: David L. Johnson, Glen Mills, Pa.; Khushrav E. Nariman; David L. Stern, both of Mount Laurel, N.J.

[73] Assignee: Mobil Oil Corporation, Fairfax, Va.

[21] Appl. No.: 08/978,249

[22] Filed: Nov. 25, 1997

[51] Int. Cl.[7] ................................................. B01D 53/50
[52] U.S. Cl. .............................. 423/242.1; 423/243.08; 423/244.01; 423/244.1; 423/239.1; 423/555
[58] Field of Search ............................... 423/555, 244.1, 423/244.01, 243.08, 242.1, 239.1, 533, 536

[56] References Cited

U.S. PATENT DOCUMENTS

| | | | |
|---|---|---|---|
| 4,183,908 | 1/1980 | Rolfe | 423/555 |
| 5,229,091 | 7/1993 | Buchanan et al. | 423/244.01 |
| 5,283,055 | 2/1994 | Luck | 423/239.1 |
| 5,547,648 | 8/1996 | Buchanan et al. | 423/210 |
| 5,728,358 | 3/1998 | Avidan et al. | 423/244.01 |

FOREIGN PATENT DOCUMENTS

| | | | |
|---|---|---|---|
| WO 95/03876 | 2/1995 | WIPO | 423/239.1 |

*Primary Examiner*—Gary P. Straub
*Assistant Examiner*—Timothy C Vanoy
*Attorney, Agent, or Firm*—Penny L. Prater; Malcolm D. Keen

[57] ABSTRACT

This invention describes a process for the scrubbing of sulfur oxides from the effluent of conventional wet lime/limestone SOx reduction processes in coal or oil-fired plants. The sulfur oxides are oxidatively sorbed onto solid sorbents such as magnesium aluminate spinel. Reduction with the appropriate reducing gases (such as hydrogen) regenerates the catalyst, also yielding a process stream concentrated in SOx. This concentrated SOx stream can then be refed to the front end of the coal or oil-fired plants, with the SOx thus produced ultimately being removed in the conventional wet scrubbing technology.

11 Claims, 1 Drawing Sheet

FIGURE
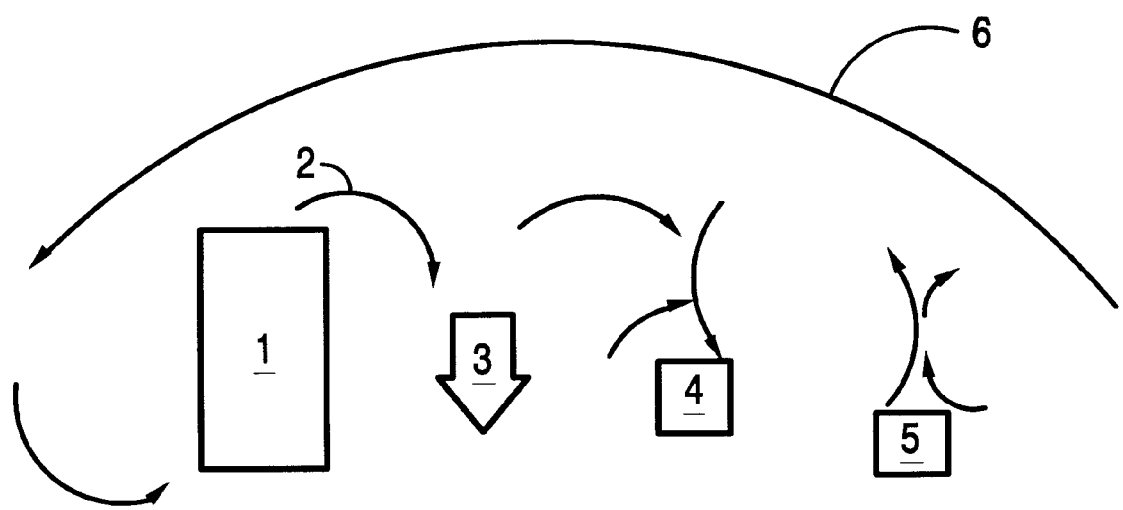

PROCESS FOR THE REDUCTION OF SO₂ FROM WET LIME/LIMESTONE TAILGAS IN POWER PLANT DESULFURIZATION PROCESSES

FIELD OF THE INVENTION

This invention describes a process for the scrubbing of sulfur oxides, using a solid sorbent such as a magnesium aluminate spinel, from the effluent of conventional wet lime/limestone SOx reduction processes in coal or oil-fired plants.

BACKGROUND OF THE INVENTION

In the Claus process, elemental sulfur is produced by reacting $H_2S$ and $SO_2$ in the presence of a catalyst. The Claus system uses a combustion chamber which, at 950°–1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The use of magnesium aluminate spinels for the oxidative sorption of SOx from effluent streams of the Claus process, followed by the reductive regeneration and reprocessing of the off-gas thus produced, has received recent attention as an attractive means to limit the potential for environmental damage which may be caused from the direct release of SOx.

The Mobil Oil SOx Treatment Process (MOST) is currently under development for a number of different applications. The first envisioned use of this technology, for Claus Tailgas scrubbing, was disclosed in U.S. Pat. No. 5,229,091. It consists of the oxidative sorption of $SO_2$ onto a solid sorbent, preferably a magnesium aluminate spinel, followed by reductive regeneration to produce and effluent containing primarily $SO_2$. with some $H_2S$ and S. This effluent is then refed to the Claus Unit for further reaction. The sulfur oxide sorbed is ultimately transformed into elemental sulfur. Reductive desorbents (reducing gases) found to be successful for this are hydrogen, hydrocarbons (methane, propane), carbon monoxide/synthesis gas combinations, hydrogen sulfide, and ammonia.

In addition to the aforementioned Claus Tailgas scrubbing application, other modes of implementing this scheme have been put forth and investigated. Some of those modes involve the scrubbing of FCC tailgas in a manner similar to that described for Claus Tailgas operations. U.S. Pat. No. 5,547,648 discloses this concept. The MOST process has also been extended to gas field applications, process heat furnaces, and to coal or oil fired plants. The process for the oxidative sorption of SOx is similar in the applications listed here. The availability of reducing gases and related process equipment allows for a fairly wide number of applications for this technology.

SUMMARY OF THE INVENTION

The use of technology for the scrubbing of SOx via sorption onto solid sorbents such as metal oxides (i.e., MOST), from the tail end of conventional technology in power plant applications is disclosed in this invention. Conventional technology, such as wet lime/limestone slurries, allows for the removal of up to about 90% of sulfur oxides. MOST technology can capture >99.9% of the SOx in process streams, as previous patents, such as those disclosed in the Background indicate. Thus, a MOST-type process could significantly lower the SOx emissions from conventional scrubber operations and allow for the use of higher sulfur-content fuels in power plant operations.

This application discloses a process for the scrubbing of sulfur oxides from the effluent of conventional wet lime/limestone SOx reduction processes in coal or oil-fired plants. The sulfur oxides are oxidatively sorbed onto magnesium aluminate spinel as solid sorbent. Reduction with the appropriate reducing gases (such as hydrogen) regenerates the catalyst, also yielding a process stream concentrated in SOx. This concentrated SOx stream can then be refed to the front end of the coal or oil-fired plants, with the SOx thus produced ultimately being removed in the conventional wet scrubbing technology. This process is capable of capturing >99% of the SOx from power plants, a significant advantage over commercial wet lime/limestone processes alone, where only 90% of the SOx can be removed, and may allow for the use of high sulfur fuels (having a sulfur content of 4% or greater)in power plant applications.

The concept of utilizing the Claus reaction for the conversion of $SO_2$ to elemental sulfur in power plant applications is known. To the best of our knowledge, however, this is the first example of technology whereby sulfur oxides can be reduced to very low levels following conventional power plant scrubbing technology.

Regulatory requirements have and will continue to force reductions in sulfur oxide emissions from various sources. Solid, regenerable SOx sorbents show promise for controlling these acid rain precursors by scrubbing these environmental contaminants prior to their release in the atmosphere.

BRIEF DESCRIPTION OF THE FIGURE

The Figure illustrates the process steps of the instant invention.

DETAILED DESCRIPTION OF THE INVENTION

The process described may be thought of as follows (see Figure): A fuel such as coal or oil is burned in the burner (1) to provide the energy input necessary ultimately for power generation. Approximately 90% of the SOx thus produced is then removed via conventional wet lime/limestone scrubbing technology (2) such as that disclosed in U.S. Pat. No. 5,298,473. Following limestone scrubbing, the residual SOx in the effluent (tailgas) from this wet scrubbing process is oxidatively sorbed onto a solid sorbent located within an absorber (3), preferably a magnesium aluminate spinel as described in U.S. Pat. No. 5,229,091 (Buchanan et al), which is incorporated by reference. The sulfated sorbent in the absorber (3) is then reduced to regenerate the sorbent and to desorb primarily sulfur oxides. Reductants for this process could include hydrogen, CO, C1 to C5 hydrocarbons, $H_2S$, and other reducing gases. Hydrogen is preferred, however. The offgas is then refed to the burner (4) where all sulfur species are converted to $SO_2$. The conventional wet scrubbing process will ultimately remove the sulfur oxides, which are recycled to extinction. The use of a sorbent system (i.e., MOST) in which >99.9% of the SOx can be removed, is key in further reducing sulfur oxide emissions from a power plant facility.

The solid sorbents can be impregnated or otherwise coated with an oxidizing catalyst or promoter that promotes the removal of nitrogen oxides and the oxidation of $SO_2$ to $SO_3$ in the presence of oxygen. It is believed that $SO_3$ is more readily adsorbed than $SO_2$. One useful catalyst is ceria (cerium oxide). Another useful catalyst is platinum. Other catalytic metals, both free and in a combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver, and combinations thereof. The sulfur oxide-capturing absorbent can be in the form of balls, pebbles, spheres, extrudates, channeled monoliths, microspheres or pellets.

It is preferred to operate the absorber containing the solid sorbent at a temperature from about 900° to about 1,400° F. A temperature of from about 1,100° to about 1,300° F. is most preferred. Oxygen should be introduced into absorber in an amount of from about 0.10 to about 10 vol %. 2 to about 4 vol % is preferred, however. Pressure within the absorber should be maintained at a pressure of from about 500 to about 20,000 GHSV. 3,000 to about 5,000 GHSV is preferred. An additional benefit of operating the absorber within these parameters is that any carbon monoxide therein is converted into carbon dioxide which is released into the environment. Other gases released from the absorber include nitrogen, oxygen, and trace amounts of sulfur dioxide along with water.

The operating parameters for the regeneration of the sorbent are equally applicable to both fluidized and fixed bed processes. Initially a GHSV of about 300 should be used when commencing regeneration of the fixed bed absorbent so that a higher concentration of liberated gases can be removed from the regenerator. As regeneration proceeds, the GHSV can be reduced to about 50 as the concentration of liberated gases diminishes. Substantially improved regeneration results are anticipated when water is co-fed into the regenerator along with the hydrocarbons. Once regeneration is completed, liberated sulfur dioxide, hydrogen sulfide, and water are recycled to the burner.

The MOST process, including operating conditions and conditions for regeneration of the sorbent, is more fully described in U.S. Pat. No. 5,229,091.

What is claimed is:

1. A process for the elimination of nearly all sulfur oxide emissions from a power plant facility, the facility comprising a burner, a wet lime/limestone scrubber, and an absorber which further comprises a solid sorbent, the process comprising the following steps:

(a) burning coal or oil in the burner to provide the energy input necessary for power generation, thereby producing sulfur oxide emissions in a flue gas stream;

(b) treating the flue gas stream of step (a) in a wet lime or limestone scrubber to remove about 90% of the sulfur oxide emissions in the flue gas stream, and to produce an effluent tailgas stream;

(c) passing the tailgas stream to the absorber for removal of sulfur oxides not removed in step (b) by sorbing in the presence of oxygen onto said solid sorbent, until said solid sorbent is saturated;

(d) treating the saturated solid sorbent with reducing gases in order to regenerate the solid sorbent and to principally desorb sulfur oxides therefrom and to produce a sulfur oxide concentrated stream; and (e) feeding the sulfur oxide concentrated stream to the burner of step (a), where all sulfur species are converted to sulfur oxides for removal in the wet lime or limestone scrubber of step (b).

2. The process of claim 1, wherein the reducing gases of step (d) are selected from the group consisting of hydrogen, carbon monoxide, hydrogen sulfide, and C1 to C5 hydrocarbons.

3. The process of claim 1, wherein the solid sorbent comprises a spinel.

4. The process of claim 3, wherein the spinel is a magnesium aluminate spinel.

5. The process of claim 1, wherein over 99.9% of the sulfur oxides are removed from the flue gas stream.

6. The process of claim 1, wherein the solid sorbent is selected from the group consisting of balls, pebbles, spheres, extrudates, channeled monoliths, microspheres or pellets.

7. The process of claim 1, wherein the solid sorbent is impregnated or otherwise coated with an oxidizing catalyst or promoter that promotes the removal of nitrogen oxides and the oxidation of $SO_2$ to $SO_3$ in the presence of oxygen.

8. The process of claim 7, wherein the oxidizing catalyst or promoter comprises ceria or Pt.

9. The process of claim 1, wherein the absorber comprising the solid sorbent is operated at a temperature from about 900° to about 1,400° F.

10. The process of claim 1, wherein oxygen is introduced into the absorber in an amount of from about 0.10 to about 10 vol %.

11. The process of claim 1 wherein said fuel has a sulfur content equal to or greater than 4.0%.

* * * * *